United States Patent [19]
Kuze et al.

[11] Patent Number: 5,459,225
[45] Date of Patent: Oct. 17, 1995

[54] PROCESS FOR PRODUCING POLYCARBONATE HAVING REDUCED RESIDUAL CHLOROFORMATE THEREIN

[75] Inventors: Shigeki Kuze; Ryozo Okumura; Yoshinobu Suwabe, all of Ichihara, Japan

[73] Assignee: Idemitsu Petrochemical Co., Ltd., Ichihara, Japan

[21] Appl. No.: 251,287

[22] Filed: May 31, 1994

Related U.S. Application Data

[63] Continuation-in-part of Ser. No. 31,828, Mar. 16, 1993, Pat. No. 5,349,042.

[30] Foreign Application Priority Data

Mar. 17, 1992 [JP] Japan ..................................... 4-060079

[51] Int. Cl.[6] .................................................. C08G 64/00
[52] U.S. Cl. ........................................... 528/196; 528/198
[58] Field of Search ....................................... 528/196, 198

[56] References Cited

U.S. PATENT DOCUMENTS 5,187,242 2/1993 Sakashita et al. ...................... 525/439
5,278,279 1/1994 Kanno et al. ........................... 528/198

*Primary Examiner*—James J. Seidleck
*Assistant Examiner*—Terressa Mosley
*Attorney, Agent, or Firm*—Oblon, Spivak, McClelland, Maier, & Neustadt

[57] ABSTRACT

A process for producing a polycarbonate, which comprises transesterifying, in the presence of an antioxidant, (A) a dihydroxy compound or a precursor thereof and (B) a carbonic acid diester having, as an impurity, a chlorine content derived from chloroformate group of at most 30 ppm, which is determined by subtracting the chlorine content extracted with water using ion chromatography from the total chlorine content contained in said carbonic acid diester determined by potentiometric titration.

19 Claims, No Drawings

PROCESS FOR PRODUCING POLYCARBONATE HAVING REDUCED RESIDUAL CHLOROFORMATE THEREIN

This application is a continuation-in-part (CIP) application of application Ser. No. 08/031,828, filed on Mar. 16, 1993.

BACKGROUND OF THE INVENTION

1. Field of the Invention

The present invention relates to a process for producing a polycarbonate, and more particularly to a process for efficiently producing a polycarbonate having excellent transparency, heat resistance, and water resistance.

2. DESCRIPTION OF THE BACKGROUND

One coventional method for producing a polycarbonate (hereinafter referred to as "PC"), is the interfacial method. This entails directly reacting an aromatic dihydroxy compound, such as bisphenol A, with phosgene. A second conventional method is the melt method which entails transesterifying an aromatic dihydroxy compound, such as bisphenol A, with a carbonic acid ester, such as diphenyl carbonate, both in a molten state.

The interfacial method suffers from several disadvantages. First, phosgene must be used, which is poisonous. Second, the production equipment used is corroded by chlorine-containing compounds, such as hydrochloric acid or sodium chloride, which are produced as by-products in the reaction. Third, impurities, such as sodium hydroxide, contaminate the resin and are difficult to separate therefrom. These impurities have deleterious effects on the physical properties of the polymer.

Alternatively, the melt method is advantageous in that PC can be produced thereby at a lower cost than by using the interfacial method. However, the melt method is disadvantageous due to the inevitable coloring of the resulting resin since the reaction usually continues for a long period of time at a temperature of 280° to 310° C.

To reduce the coloring in the melting method, various improvements have been proposed. Japanese Patent Publication No. 39972/1986 and Japanese Patent Application Laid-Open No. 223036/1988, for instance, disclose a method using a particular catalyst. Japanese Patent Application Laid-Open No. 151236/1986 and Japanese Patent Application Laid-Open No. 158719/1987 disclose methods wherein antioxidants are added in the latter stage of reaction. Moreover, Japanese Patent Application Laid Open No. 62522/1986 and Japanese Patent Application Laid-Open No. 153925 disclose improvements in processes, that is, employment of a twin-screw vent-type kneading extruder, and horizontal stirred polymerization tank, respectively. Further, Japanese Patent Application Laid-Open No. 175722/1990 discloses a process for controlling the content of a hydrolyzable chlorine compound in the monomer under a prescribed level. Such problems, however, have not yet been adequately solved, and a satisfactory PC has not yet been obtained.

SUMMARY OF THE INVENTION

Accordingly, it is an object of the present invention to provide a process for producing a polycarbonate which avoids the above disadvantages.

It is also an object of the present invention to provide a polycarbonate which is produced in the presence of an antioxidant.

The above objects and others are provided by a polycarbonate which is produced by transesterifying, in the presence of an antioxidant, (A) a dihydroxy compound and (B) a carbonic acid diester having, as an impurity, a chlorine content derived from a chloroformate group of at most 30 ppm, which chlorine content is determined by subtracting the chlorine content extracted with water using ion chromatography from the total chlorine content contained in the carbonic acid diester determined by potentiometric titration.

DETAILED DESCRIPTION OF THE PREFERRED EMBODIMENTS

In the present invention, numerous dihydroxy compounds may be used as Component (A), including at least one compound of aromatic dihydroxy compounds and aliphatic dihydroxy compounds, as well as "precursors" thereof, such as bisesters of aromatic dihydroxy compounds, bisesters of aliphatic dihydroxy compounds, carbonates of aromatic dihydroxy compounds or carbonates of aliphatic dihydroxy compounds.

Generally, the aromatic dihydroxy compounds used as Component (A) include, a compound represented by the formula (I):

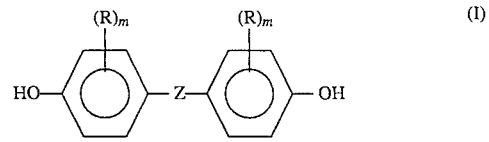

wherein, R is a hydrogen atom, a halogen atom, such as chlorine, bromine, fluorine, and iodine or an alkyl group having 1 to 8 carbon atoms, and when R is plural, they may be the same or different, and m is a number of 0 to 4; Z indicates a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or —S—, —SO—, —SO$_2$—, —O—, —CO— bond or a bond represented by the formula (II):

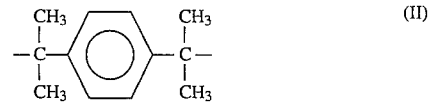

Specific examples of these compounds are bis(hydroxyaryl) alkanes such as bis (4-hydroxyphenyl)methane, 1,1-bis (4-hydroxyphenyl)ethane, 2,2 -bis(4 -hydroxyphenyl)propane (bisphenol A), 2,2-bis(4-hydroxyphenyl)butane, 2,2-bis(4-hydroxyphenyl)octane, 2,2 -bis(4 -hydroxyphenyl)phenylmethane, 2,2-bis(4-hydroxy-1-methylphenyl)propane, 1,1-bis(4-hydroxytetiary-butylphenyl)propane, 2,2-bis(4-hydroxy-3-bromophenyl) propane, 2,2-bis(4-hydroxy-3,5-tetramethylphenyl)propane, 2,2-bis(4-hydroxy-3-chlorophenyl)propane, 2,2-bis(4-hydroxy-3,5tetrachlorophenyl)propane and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl) cyclohexane, and 1,1-bis(4-hydroxyphenyl)-3,5,5-trimethylcyclohexane; dihydroxyaryl ethers such as 4,4-dihydroxydiphenyl ether, and 4,4'-dihydroxy-3,3'-dimethylphenyl ether; dihydoxydiaryl sulfides such as 4,4'-dihydroxydiphenyl sulfide; 4,4'-dihydroxy-3,3'-dimethyldiphenyl sulfide; dihydroxyaryl sulfoxides such as 4,4'-dihydroxydiphenyl sulfoxide, and 4,4'-dihydroxy-3,3'- dimethyldiphenyl sulfoxide; dihydroxydiaryl sulfones such as 4,4'-dihydroxydiphenyl sulfone, and 4,4'-dihydroxy-3,3'-dimethyldiphenyl sulfone; and dihydroxybenzene, halogen-substituted dihydroxybenzene such as 1,4-dihydroxy-2,5-dichlorobenzene, and alkyl-substituted dihydroxybenzene such as 1,4-dihydroxy-3-methylbenzene.

The aliphatic dihydroxy compounds, one of Component (A), which may be used are numerous. Examples thereof are butane-1,4-diol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcylohexane, p-xylylene glycol, and 2,2-bis-(4-hydroxycyclohexyl)-propane. Further, ethoxylated products and propoxylated products of dihydric alcohols or dihydric phenols, for example, bis-oxyethyl-bisphenol A, bis-oxyethyltetrachlorobisphenol A or bis-oxyethyl-tetrachlorohydroquinone may also be used.

As the bisesters of aromatic dihydoxy compounds, bisesters of aliphatic dihydroxy compounds, carbonates of aromatic dihydroxy compounds or carbonates of aliphatic dihydroxy compounds which are used as component (A), examples of the bisesters of the above-mentioned compounds are compounds represented by the formula (III):

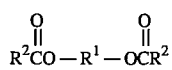
(III)

wherein $R^1$ indicates the residue of removing two hydroxyl groups from the above aliphatic dihydroxy compound, and $R^2$ indicates an alkyl group having 1 to 6 carbon atoms or a cycloalkyl group having 4 to 7 carbon atoms;

compounds represented by the formula (IV):

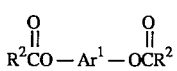
(IV)

wherein $Ar^1$ indicates the residue of removing two hydroxyl groups from the above-mentioned aromatic dihydroxy compound, and $R^2$ is as defined above;

compounds represented by the formula (V):

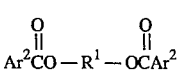
(V)

wherein $Ar^2$ indicates an aryl group, and $R^1$ is as defined above;

and compounds represented by the formula (VI):

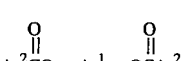
(VI)

wherein $Ar^1$ and $Ar^2$ are as defined above.

Examples of carbonates of the above compounds are compounds represented by the formula (VII):

(VII)

wherein $R^1$ and $R^2$ are as defined above;

compounds represented by the formula (VIII):

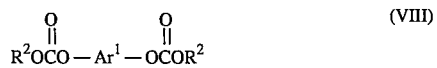
(VIII)

wherein $R^2$ and $Ar^1$ are as defined above; compounds represented by the formula (IX):

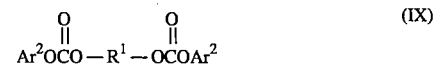
(IX)

wherein $R^1$ and $Ar^2$ are as defined above;

and compounds represented by the formula (X):

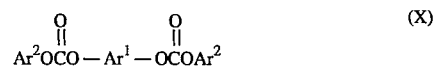
(X)

wherein $Ar^1$ and $Ar^2$ are as defined above.

In the present invention, as the dihydroxy compound as Component (A), any one of the above-mentioned compounds may be used.

On the other hand, the carbonic diester used as component (B) in the present invention may be one of numerohs such bisesters. An example thereof is at least one compound of diaryl carbonates, dialkyl carbonates or alkylaryl carbonates.

As preferred examples of diaryl carbonates used as Component (B) are compounds represented by the formula (XI):

(XI)

wherein $Ar^2$ is as defined above;

or compounds represented by the formula (X):

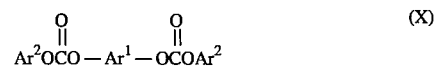
(X)

wherein $Ar^1$ and $Ar^2$ are as defined above.

As preferred examples of dialkyl carbonates are compounds represented by the formula (XII):

(XII)

wherein $R^2$ is as defined above;

or compounds represented by the formula (VIII): t,0100 wherein R 2 and Ar' are as defined above. Preferred examples of alkylaryl carbonates are compounds represented by the formula (XIII):

(XIII)

wherein $R^2$ and $Ar^2$ are as defined above;

or compounds represented by the formula (XIV):

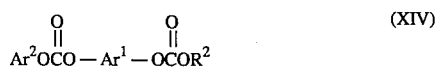
(XIV)

wherein $R^2$, $Ar^1$ and $Ar^2$ are as defined above.

Specific examples of these diaryl carbonates are diphenyl carbonate, ditolyl carbonate, bis(chlorophenyl) carbonate, m-cresyl carbonate, dinaphthyl carbonate, bis(diphenyl) carbonate, and bisphenol A-bisphenyl carbonate.

Specific examples of these dialkyl carbonates are diethyl carbonate, dimethyl carbonate, dibutyl carbonate, dicyclohexyl carbonate, and bisphenol A-bismethyl carbonate.

Specific examples of alkylaryl carbonates are methylphenyl carbonate, ethylphenyl carbonate, butylphenyl carbonate, cyclohexyl carbonate, and bisphenol A-methylphenyl carbonate. Among the above, diphenyl carbonate is particularly preferable.

As the carbonic diester as component (B), anyone of the above-mentioned compounds may be used. The process of the present invention employs particularly those carbonic diesters having, as an impurity, a chlorine content derived from chloroformate group being not more than 30 ppm, preferably not more than 10 ppm. In using of these carbonic diesters, a polycarbonate excellent in transparency and tone of color can be obtained.

Herein, as the impurity contained in the carbonic diester, chlorine content derived from chloroformate group is generally determined as exemplified in the following manner.

First, 5 g of carbonic diester is dissolved into 50 ml of dioxane, and then the solution is decomposed with 50 mml of 5% solution of potassium hydroxide in methanol at room temperature. The resulting chlorine content is determined using a potentiometric titation apparatus (for example, COMTIME-7 manufactured by Hiranuma Industry), and the result is referred to as chlorine content A.

Subsequently, 5 g of carbonic diester is dissolved into 10 ml of toluene, 10 ml of an eluate (2.8 mM $NaHCO_3$/2.25 mm $Na_2CO_3$) was added to the solution. Then, water is added thereto, and the mixture is stirred and extracted. The chlorine content in the extract is determined by the use of ion chromatography (for example, IC7000P manufactured by Yokogawa Electric Co., Ltd.), and the result is referred to as chlorine content B.

A value found by deducting chlorine content B from chlorine content A determined in the above-mentioned manner is referred to as chlorine content C.

On the other hand, as the result of analysis of carbonic diphenyl using GC-MS (GC:5880 produced by Hewlett Packard Ltd., MS:JMS-AX505H manufactured by JOEL Ltd.), almost the same amount of phenylchloroformate as chlorine content C was detected.

In the present invention, chlorine content C determined in the above manner was regarded as and defined herein as "chlorine content derived from chloroformate group".

In order to purify carbonic diester to obtain a carbonic diester having, as an impurity, not more than 30 ppm of chlorine content derived from chloroformate group, a lower alcohol such as ethanol is used as recrystallization solvent, and recrystallizing purification is conducted in heat reflux for 20 minutes or more. Herein, if the heat reflux period is shorter than 20 minutes, chlorofomate is not sufficiently decomposed.

Further, carbonic diester can also be purified by a method in which a lower alcohol such as ethanol is used as recrystallization solvent, and recrystallization purification is conducted in the coexistence of a tertiary amine in a trace amount (around 1.0 to 0.01 wt %) such as pyridine or triethylamine, and the resulting crystal is washed with a lower alcohol and pure water.

Otherwise, the purification can also be performed by dissolving carbonic diester into an organic solvent immiscible with water such as methylene chloride, washing with an aqueous alkali solution of pH 9 to 11 or 10 to 13, and then washing with acid and water in a sufficient amount to neutralize it. Subsequently, the organic phase is separated and concentrated, and the resulting carbonic diester can be recrystallized or vacuum-distilled.

In the process of the present invention, the above-mentioned (A) and (B) are reacted, but these can be reacted also in an inactive solvent. The inactive solvent is used as a diluent for the purpose of lowering the viscosity of the reaction product.

Inactive solvent to be used herein can be appropriately selected depending on the conditions. Specific examples of them are aromatic compounds such as diphenyl ether, halogenated diphenyl ether, diphenyl sulfone, benzophenone, polyphenyl ether, dichlorobenzene, and methylnaphthalene; gases such as carbon dioxide, dinitrogen oxide, and nitrogen; alkanes such as ethane and propane; cycloalkanes such as cyclohexane, tricyclo(5,2,10)-decane, cyclooctane, and cyclododecane; alkenes such as ethene and propene;, and sulfur hexafluoride. As the inactive solvent to be used in the present invention, diphenylether is particularly preferred.

Further, in the present invention, terminal stoppers as shown below can be used though not particularly limited. Specific examples of these terminal stoppers are o-n-butylphenol, m-n-butylphenol, p-n-butylphenol, o-isobutylphenol, m-isobutylphenol, p-isobutylphenol, o-t-butylphenol, m-tbutylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, mcyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-dicumylphenol represented by the formula:

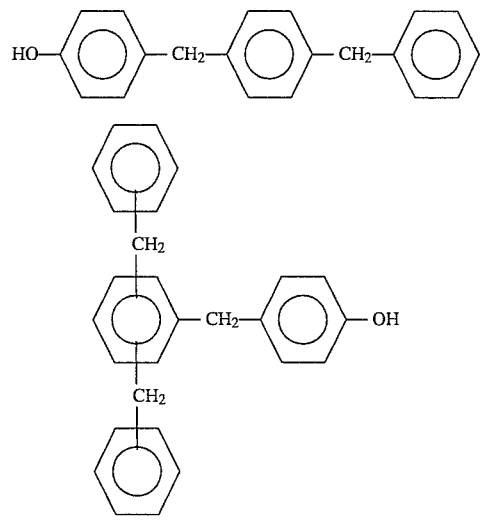

3,5-dicumylphenol, and chroman derivative such as the monohydric phenol represented by the formula:

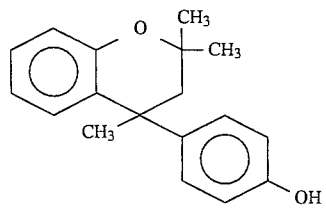

-continued

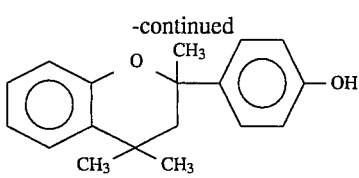

Of the above-mentioned phenols, though not particularly limited, p-t-buylphenol, p-cumylphenol, p-phenylphenol and the like are preferred in the present invention.

Other terminal stoppers which may be used are carbonic diester compounds. Specific examples of these terminal stoppers of carbonic diester compounds are carbobutoxyphenylphenyl carbonate, methylphenylbutylphenyl carbonate, ethylphenylbutylphenyl carbonate, dibutyldiphenyl carbonate, biphenylphenyl carbonate, dibiphenyl carbonate, cumylphenylphenyl carbonate, dicumylphenyl carbonate, naphthylphenylphenyl carbonate, dinaphtylphenyl carbonate, carbopropoxyphenylphenyl carbonate, carbobutoxyphenylphenyl carbonate, carbomethoxy-t-butylphenylphenyl carbonate, carboprotoxyphenylmethylphenylphenyl carbonate, chromanylphenyl carbonate, and dichromanyl carbonate. Further examples are compounds represented by the formula:

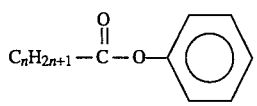

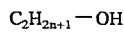

(wherein n is an integer of 7 to 30):

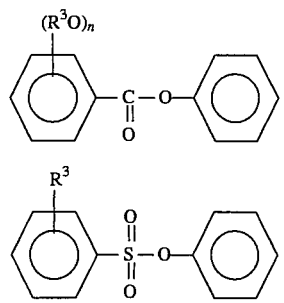

wherein $R^3$ represents an alkyl group having 1 to 12 carbon atoms, and n is an integer of 1 to 3.

If the amount of terminal stopper such as monohydric phenol or carbonic diester compound as mentioned above is in the range of 0.05 mol % to 10 mol % based on 1 mol of dihydroxy compound as Component (A), the terminals of the hydroxyl groups of the resulting polycarbonate are sealed. Accordingly, a polycarbonate having excellent heat resistance and water resistance is obtained.

Whole amount of these monohydric phenols or carbonic diester compounds may be added to reaction system in advance, or a part of them may be added to the reaction system in advance and the rest may be added as the reaction proceeds. Further, in some cases, whole amount of them may be added to the system after a partial progress of polycondensation reaction of the above-mentioned (A) dihydroxy compound and (B) carbonic compound.

Further, in the present invention, though not particularly limited, phloroglucine, trimellitic acid, 1,1,-tris(4-hydroxyphenyl)ethane, 1-[α-methyl-α-(4'-hydroxyphenyl)ethyl]-4-[α', α'-bis(4''-hydroxyphenyl)ethyl]benzene, α, α', α''-tris(4-hydroxyphenyl)-1,3,5-triisopropylbenzene, isatin-bis(ocrezol) and the like can be used as the branching agent.

In the present invention, a catalyst is not particularly required, but a conventional catalyst can be used to promote the transesterification reaction. Specific examples of the catalyst are single substance, oxide, hydroxide, amide compound, alcholato, phenolato of alkali metal or alkaline earth metals; basic oxides of metals such as ZnO, PbO and $Sb_2O_3$; organotitanium compounds, soluble manganese compounds; acetates of Ca, Mg, Zn, Pb, Sn, Mn, Cd, or Co. Further, catalysts in combination use of nitrogen-containing basic compound and boron compound; nitrogen-containing basic compound and alkali(ne earth) metal compound; nitrogen-containing basic compound and alkali(ne earth) metal compound and boron compound are also used.

In the process of the present invention, the reaction proceeds in accordance with the conventional transesterification process. The procedures and conditions of the process of the present invention are specifically described as follows:

As Component (A), dihydroxy compounds such as aromatic dihydroxy compounds and aliphatic dihydroxy compounds, as well as "precursors" thereof, such as bisesters of aromatic dihydroxy compounds; carbonates of aromatic dihydroxy compounds; bisesters of aliphatic dihydroxy compounds; or carbonates of aliphatic dihydroxy compounds, as mentioned above, may be used. As Component (B), carbonic compounds such as diaryl carbonates, dialkyl carbonates or alkylaryl carbonates are used. Components (A) and (B) should be compounded in such a ratio that the amount of carbonate be 1 to 1.5 times (mol) that of dihydroxy compound. Under some conditions, the amount of the carboxylic compound is preferred to be 1.02 to 1.20 times (mol) that of dihydroxy compound, that is a little excess of the stoichiometric amount.

The reaction temperature in the process is not specifically limited, but usually in the range of 100° to 330° C., and it is preferred to gradually raise the temperature to 180° C. to 300° C. according to the progress of the reaction. This reaction proceeds slowly under 100° C., while over 330° C. thermal deterioration of polymer is undesirably caused.

The pressure during the reaction is selected according to the reaction temperature as well as the vapor pressure monomers to be used. However, the reaction pressure which may be used is not limited and any reaction pressure may be used as long as the reaction is effected efficiently. Usually, in the initial stage of the reaction, the reaction proceeds at atmospheric pressure or under a higher pressure, that is, under a pressure of from 1 to 50 atm (760 to 38,000 torr), while in the latter stage of the reaction, the reaction is conducted under a reduced pressure, preferably about 0.01 to 100 torr. The reaction is continued until the desired molecular weight is obtained, and a reaction time of about 2 to 10 hours is generally used is 2 to 10 hours.

The above-mentioned reaction is carried out in the absence of an inactive solvent, but may be performed as needed in the presence of an inactive solvent in an amount of about 1 to 150% by weight based on the amount of PC.

In the present invention, as the reaction proceeds, phenols and alcohols corresponding to the carbonic compound used or esters thereof and inactive solvents are also released from the reactor. These products can be recycled through separation and purification, and it is preferable to install an equipment for recovering the aforesaid compounds.

The reaction in the present invention can be performed batchwise or continuously, and in any equipment. When the reaction is performed in continuous system, at least two reactors should be used to provide the above-described reaction conditions.

The structure of the reactor to be used in the present invention is not particularly limited, and any having a stirring function may be employed. However, reactors having a with stirring function for high viscosities are preferred, since the viscosity rises in the latter stage of the reaction. The reactor is not limited to the tank-type, but may also be an extruder-type.

In the process of the present invention, antioxidants can be used as needed. Specific examples thereof are phosphorus-based antioxidants such as tris(nonylphenyl)phosphite, trisphenylphosphite, 2-ethylhexyldiphenylphosphite, trimethylphosphite, triethylphosphite, tricredylphosphite, and triarylphosphite.

PC obtained according to the above process may be directly pelletized, or may be molded with extruder or the like.

PC obtained according to the present invention can be used with conventional additives such as plasticizer, pigment, lubricating agent, releasing agent, stabilizer, and inorganic filler.

Further, this PC can be blended with polymers such as polyester, polysulfonate, polyamide, and polyphenylene oxide.

As described above, according to the present invention, by the use of carbonic diester having, as an impurity, a chlorine content of not more than 30 ppm derived from the chloroformate group, PC excellent in transparency, tone of color, heat-resistance, and water-resistance can be efficiently produced.

In addition, since the transesterification method with simple process is employed, a production of PC at a low cost is realized.

Consequently, the present invention can be effectively and extensively utilized as a process for producing a high quality polycarbonate in an industrially advantageous manner.

The present invention will now be explained in greater detail with reference to certain examples, which are provided solely for the purpose of illustration and are not intended to be limitative.

Preparation Example 1

(Preparation of Diphenylcarbonate A)

To 3,000 g of a 20% aqueous solution of sodium hydroxide (15 mol of sodium hydroxide) were added 1,000 g (10.6 mol) of phenol, 10.7 g (0.106 mol) of triethylamine, and 5 L (L=liter) of methylene chloride and 660 g (6.7 mol) of phosgene was blown into the mixture to react. When the reaction was completed, 100 ml of 30% hydrochloric acid was added to wash the mixture, and the organic phase was separated. Subsequently, after washing with 3.5 L of water, the organic phase was separated, and methylene chloride phase was removed to obtain crude diphenylcarbonate A, which was vacuum-distilled to obtain Diphenylcarbonate A. The chlorine content in Diphenylcarbonate A derived from chloroformate group was 3,000 ppm.

Preparation Example 2

(Preparation of Diphenylcarbonate B)

To 500 g of diphenylcarbonate A, 1 liter of ethanol was added and heated to dissolve. After dissolution, the solution was heat refluxed for 30 minutes, and heat filtered with filter paper, slowly cooled to room temperature, and crystal was precipitated out. Subsequently, the crystal was taken out, and sufficiently washed with ethanol to obtain Diphenylcarbonate B. The chlorine content in Diphenylcarbonate B derived from chloroformate group was 6 ppm.

Preparation Example 3

(Preparation of Diphenylcarbonate C)

The procedure of Preparation Example 2 was repeated to obtain Diphenylcarbonate C except that 0.5 g of pyridine was allowed to coexist. The chlorine content in Diphenylcarbonate C derived from chloroformate group was under 1 ppm.

Preparation Example 4

(Preparation of Diphenylcarbonate D)

500 g of Diphenylcarbonate A was dissolved into 3 L of methylene chloride, and 1 L of 0.01N aqueous solution of sodium hydroxide was added thereto to be shaken in a shaker for 20 minutes. Subsequently, the mixture was washed with 0.1N hydrochloric acid, and with water, and then washing with water was repeated until the electric conductivity of the aqueous phase finally reached 5 μs/cm. Then, the organic phase was separated, and methylene chloride was removed to obtain a diphenyl carbonate, which was recrystallized and purified in the same manner as in Preparation Example 2 to obtain Diphenylcarbonate D. The chlorine content in Diphenylcarbonate D derived from chloroformate group was under 1 ppm.

Preparation Example 5

(Preparation of Diphenylcarbonate E: The Same Method for Purification as that of Example 1 of Japanese Patent Application Laid-Open No. 175722/1990)

A diphenylcarbonate (produced by Bayer A. G.) having 5.9 ppm of hydrolyzable chlorine content was washed twice with warm water at 80° C. having pH of 7.0, and then vacuum-distilled to obtain Diphenylcarbonate E having not more than 0.1 ppm of hydrolyzable chlorine content in a recovery of 90%. The chlorine content in Diphenylcarbonate E derived from chloroformate group was 45 ppm.

Example 1

In a 1.4 L nickel-steel autoclave (equipped with a stirrer), 228 g (1 mol) of bisphenol, and 257 g (1.2 mol) of Diphenylcarbonate B were placed to be subjected to nitrogen substitution 5 times. The resulting mixture was heated to 180° C. to melt bisphenol A and Diphenylcarbonate B. Subsequently, 2.5 mg ($1\times10^{-5}$ mol) of $(C_4H_9)_4NBH_4$ was added as the catalyst, and the mixture was heated to a temperature of 220° C., and simultaneously, stirring was started and a trace amount of nitrogen was passed. Then phenol began to be distilled away. After that, the reactant was kept at 220° C. for 4 hours.

Subsequently, the temperature was gradually raised from 220° C. to 280° C. over a period of 1 hour, while the vacuum degree was raised to remove away the residual diphenylcarbonate and to promote transesterification. Finally with the pressure being 0.5 torr, the mixture was reacted for 1 hour under stirring, and lastly, PC as a viscous and transparent polycondensate was left. The PC was dissolved into methylene chloride, and determined for the viscosity average molecular weight to find a value of 22,000.

The resulting viscous and transparent PC was pulverized and pelletized with an extruder at 220° to 270° C. The pellet was injection molded, and the molding was subjected to YI evaluation, Thermal Deterioration Test, and Steam Resistance Test.

The result is shown in Table 1.

Example 2

The procedure of Example 1 was repeated except that Diphenylcarbonate C was used. The result is shown in Table 1.

Example 3

The procedure of Example 1 was repeated except that Diphenylcarbonate D was used. The result is shown in Table 1.

Comparative Example 1

The procedure of Example 1 was repeated except that Diphenylcarbonate A was used. The result is shown in Table 1.

Comparative Example 2

The procedure of Example 1 was repeated except that Diphenylcarbonate E was used. The result is shown in Table 1.

Example 4

The procedure of Example 1 was repeated except that 6.8 g (0.05 mol based on bisphenol A) of p-cumylphenol was initially placed as terminal stopper. The result is shown in Table 1.

Example 5

The procedure of Example 1 was repeated except that 28.2 g of diphenyl ether was added as an inactive solvent and no catalyst was used. The result is shown in Table 1.

Preparation Example 6

(Preparation of Dimethylcarbonate A)

To 10 L of methylene chloride, 320 g (10 mol) of methanol, and 948 g (12 mol) of pyridine were added, and 480 g (4.8 mol) of phosgene was blown thereinto to be reacted. When the reaction was over, the reactant was washed with 5 L of 0.1N hydrochloric acid to separate the organic phase. Subsequently, after washing with water, the organic phase was separated out, and methylene chloride phase was removed to obtain a dimethylcarbonate, which was vacuum distilled to obtain Dimethylcarbonate A. Chlorine content in Dimethylcarbonate A, derived from chloroformate group was 2,800 ppm.

Preparation Example 7

(Preparation of Dimethylcarbonate B)

100 g of Dimethylcarbonate B was dissolved into 1 L of methylene chloride, and 1 L of 0.1N aqueous solution of sodium hydroxide was added thereto, and the mixture was shaken in a shaker for 20 minutes. This operation was conducted two times. Then, the mixture was washed with 0.2N hydrochloric acid and with water, and washing with water was repeated until the electric conductivity of the aqueous phase finally reached 5 μs/cm. Subsequently, the organic phase was separated out, and methylene chloride was removed to obtain a dimethyl carbonate. The dimethylcarbonate was vacuum distilled to obtain Dimethylcarbonate B. The chlorine content in Dimethylcarbonate B, derived from chloroformate group was under 1 ppm.

Example 6

In an autoclave equipped with a distillation apparatus, 228 g (1 mol) of bisphenol A, 157 (1.7 mol) of Dimethylcarbonate B, and 0.27 g (0.05 mol) of $KBH_4$ were placed and subjected to nitrogen substitution by pressurizing-depressurizing operation. Then, the reaction temperature was raised to 180° C., and the reaction was conducted for 1 hour at a pressure of 8 $kg/cm^2$ under stirring. In this reaction, the resulting methanol and excess dimethylcarbonate were distilled away.

Subsequently, the resulting oligomer was placed in a round bottom reactor at atmospheric pressure, and gradually heated to 240° to 250° C. while the pressure was reduced. About hours later, the reactant was heated to 280° C. at a pressure of about 1 mmHg finally, and treated for 15 minutes. As methanol was removed away, the solution became viscous. As the result of determination, the viscosity average molecular weight of the resulting polymer corresponded to 20,000.

The resulting viscous and transparent condensation was pulverized, and pelletized at 220° to 270° C. in an extruder. The pellet was injection molded, and the molding was subjected to YI evaluation, Thermal Deterioration Test, and Steam Resistance Test. The result is shown in Table 1.

Comparative Example 3

The procedure of Example 6 was repeated except that Dimethylcarbonate A was used. The result is shown in Table 1.

TABLE 1

| | Chlorine content, derived from Chloroformate group*[1] (ppm) | Viscosity average molecular weight |
|---|---|---|
| Example 1 | 6 | 22,000 |
| Example 2 | 1> | 22,000 |
| Example 3 | 1> | 22,000 |
| Comparative Example 1 | 3,000 | 21,000 |
| Comparative Example 2 | 45 | 21,000 |
| Example 4 | 1> | 20,500 |
| Example 5 | 1> | 21,000 |
| Example 6 | 1> | 18,000 |
| Comparative Example 3 | 2,800 | 16,000 |

| | YI | Thermal deterioration test (ΔYI) | Steam resistance test |
|---|---|---|---|
| Example 1 | 3.5 | 3.8 | Transparent |
| Example 2 | 3.2 | 3.0 | Transparent |
| Example 3 | 3.1 | 3.0 | Transparent |
| Comparative Example 1 | 29.0 | 20.5 | Milky |
| Comparative Example 2 | 9.2 | 17.0 | Slightly Milky |
| Example 4 | 2.5 | 2.8 | Transparent |
| Example 5 | 1.8 | 2.5 | Transparent |
| Example 6 | 4.0 | 4.0 | Transparent |
| Comparative Example 3 | 21.0 | 35.5 | Milky |

*[1]In carbonic diester

Example 7

In a 1.4 L nickel-steel autoclave (equipped with a stirrer), 228 g (1 mol) of bisphenol A, and 257 g (1.2 mol) of diphenylcarbonate B were placed to be subjected to nitrogen substitution 5 times. The resulting mixture was heated to 180° C. to melt bisphenol A and diphenylcarbonate B. Subsequently, 2.5 mg (1×10$^{-5}$ mol) of (C$_4$H$_9$)$_4$NBH$_4$ was added as the catalyst, and the mixture was heated to a temperature of 220° C., and simultaneously, stirring was started and a trace amount of nitrogen was passed. Then the resultant phenol began to be distilled away. After that, the reactant was kept at 220° C. for 4 hours.

Subsequently, the temperature was gradually raised from 220° C. to 280° C. over a period of 1 hour, while the vacuum degree was raised to remove away the residual diphenylcarbonate and to promote transesterification. Finally, with the pressure being 0.5 torr, the mixture was reacted for 1 hour under stirring.

Subsequently, the autoclave pressure was restored to atmospheric pressure by means of nitrogen and tris-(nonylphenyl)phosphite was added in the autoclave as an antioxidant in an amount of 200 mg, that is, 880 ppm based on bisphenol A, followed by further stirring for 15 minutes to finalize the reaction.

Lastly, PC as a viscous and transparent polycondensate was left. The PC was dissolved into methylene chloride, and determined for the viscosity-average molecular weight to find a value of 22,000.

The resulting viscous and transparent PC was pulverized and pelletized with an extruder at 220° to 270° C. The pellet was injection molded, and the molding was subjected to YI evaluation, thermal deterioration test, and steam resistance test. The results are shown in Table 2.

Example 8

The procedure of Example 7 was repeated except that diphenylcarbonate C was used. The results are shown in Table 1.

Example 9

The procedure of Example 7 was repeated except that diphenylcarbonate D was used. The results are shown in Table 2.

Example 10

The procedure of Example 7 was repeated except that 6.8 g (0.05 mol based on bisphenol A) of p-cumylphenol was initially placed as terminal stopper. The results are shown in Table 2.

TABLE 2

| No. | Viscosity-average molecular weight | YI | Thermal deterioration test (ΔYI) | Steam resistance test |
|---|---|---|---|---|
| Example 7 | 22,000 | 3.3 | 0.8 | Transparent |
| Example 8 | 22,000 | 3.0 | 0.6 | Transparent |
| Example 9 | 22,000 | 2.9 | 0.5 | Transparent |
| Example 10 | 20,500 | 2.4 | 0.5 | Transparent |

The conditions for the above-mentioned physical properties test are shown as follows.
1) YI Determined in accordance with JIS K7103-77. Determined by the use of Color Meter SM-3 manufactured by Instrument Co., Ltd.
2) Thermal Deterioration Test Shown by the difference (ΔYI) between YI of the molding molded at 320° C. and YI of the molding product molded after staying in the cylinder for 20 minutes.
3) Steam Resistance Test After a plate 3 mm in thickness was exposed to steam at 120° C. for 48 hours, the state of the plate was judged visually.

Having described the present invention, it will now be apparent to one of ordinary skill in the art that many changes and modifications may be made to the embodiments described herein without departing from the spirit and the scope of the present invention.

What is claimed as new and desired to be secured by Letters Patent of the United States is:

1. A process for producing a polycarbonate, which comprises transesterifying, in the presence of an antioxidant, (A) a dihydroxy compound or a precursor thereof and (B) a purified carbonic acid ester having, as an impurity, a chlorine content derived from chloroformate group of at most 30 ppm, which process comprises:

(a) reacting said dihydroxy compound or a precursor thereof with said purified carbonic acid diester in the presence of said antioxidant, which is selected from the group consisting of tris(nonylphenyl)phosphite, triphenylphosphite, trimethylphosphite, 2-ethylhexyldiphenylphosphite, triethylphosphite, tricredylphosphite and triarylphosphite, at a temperature of from about 100° C. to 330° C. at a pressure of about 1 to 50 atmospheres to form an oligomer; and (b) further reacting said oligomer a temperature and under a reduced pressure of about 0.01 to 100 torr to form said polycarbonate of a desired molecular weight; and wherein said purified carbonic acid diester is purified prior to reaction by either:

(i) being dissolved in a water-immiscible organic solvent, washed with an aqueous alkali solution having a pH of from 9 to 13, and then being washed with aqueous acid solution in an amount sufficient to effect neutralization, or (ii) being recrystallized from ethanol in the presence of a tertiary amine in the amount of 0.01 to 1.0 wt % and the resulting crystal being washed by a lower alcohol and water.

2. The process according to claim 1, wherein said carbonic acid diester (B) has a chlorine content derived from chloroformate group of less than 1 ppm.

3. The process according to claim 1, wherein the antioxidant is at least one member selected from the group consisting of tris (nonylphenyl)phosphite, trisphenylphosphite, 2-ethylhexyldiphenylphosphite, trimethylphosphite, triethylphosphite, tricredylphosphite, and triarylphosphite.

4. The process according to claim 1, wherein the antioxidant is used in an amount of about 100 to 5000 ppm by weight based on the dihydroxy compound (A) or precursor thereof.

5. The process according to claim 1, wherein the dihydroxy compound has the formula:

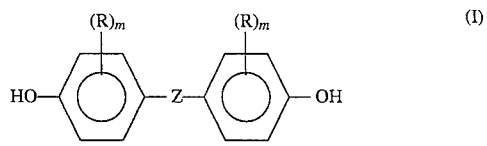

wherein R is a hydrogen atom, a halogen atom or an alkyl group having 1 to 8 carbon atoms, and when R is plural, each R is the same or different, and m is a number of 0 to 4; Z is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or —S—, —SO—, —SO$_2$—, —O—, —CO—, or a direct bond or a linking group of the formula:

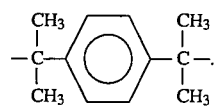 (II)

6. The process according to claim 1, wherein the carbonic acid diester is selected from the group consisting of diaryl carbonates, dialkyl carbonates and alkylaryl carbonates.

7. The process according to claim 6, wherein the chlorine content of the carbonic diester is at most 10 ppm.

8. The process according to claim 1, wherein the dihydroxy compound is selected from the group consisting of aromatic dihydroxy compounds and aliphatic dihydroxy compounds, and said presursor compound is selected from the group consisting of bisesters of aromatic dihyoxy comounds, bisesters of aliphatic dihydroxy compounds.

9. The process according to claim 6, wherein said diaryl carbonate is selected from the group consisting of diphenyl carbonate, ditolyl carbonate, bis (chlorophenyl) carbonate, m-cresyl carbonate, dinaphthyl carbonate, bis(diphenyl) carbonate and bisphenol A-bisphenol carbonate.

10. The process according to claim 6, wherein said dialkyl carbonate is selected from the group consisting of diethyl carbonate, dimethyl carbonate, dibutyl carbonate, dicyclohexyl carbonate and bisphenol A-bismethyl carbonate.

11. The process according to claim 6, wherein said alkylaryl carbonate is selected from the group consisting of methylphenyl carbonate, ethylphenyl carbonate, butylphenyl carbonate, cyclohexyl carbonate, diphenyl carbonate and bisphenol A-methylphenyl carbonate.

12. The process according to claim 1, which is further conducted in the presence of an inert medium for reducing viscosity of the reaction product.

13. The process according to claim 12, wherein said inert medium is diphenyl ether.

14. The process according to claim 1, which is further conducted in the presence of a transesterification catalyst.

15. The process according to claim 1, wherein said dihydroxy compound (A) or precursor thereof and said carbonic diester (B) are used in a ratio such that the amount of (B) is from 1 to 1.5 moles per mole of (A).

16. The process according to claim 1, which is conducted at a temperature in the range of from 180° to 300° C.

17. The process according to claim 1, wherein said pH in purification ii) is from 9 to 11.

18. The process according to claim 1, wherein said pH in purification ii) is from 10 to 13.

19. The process according to claim 1, wherein said tertiary amine is selected from the group consisting of pyridine or triethylamine.

* * * * *